United States Patent
Zhou

(10) Patent No.: US 9,829,731 B2
(45) Date of Patent: Nov. 28, 2017

(54) LIQUID CRYSTAL DISPLAY DEVICE AND DOUBLE SIDED TAPE THEREFOR

(71) Applicant: SHENZHEN CHINA STAR OPTOELECTRONICS TECHNOLOGY CO., LTD., Shenzhen (CN)

(72) Inventor: Gege Zhou, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/417,158

(22) PCT Filed: Dec. 24, 2014

(86) PCT No.: PCT/CN2014/094824
§ 371 (c)(1),
(2) Date: Jun. 6, 2016

(87) PCT Pub. No.: WO2016/090677
PCT Pub. Date: Jun. 16, 2016

(65) Prior Publication Data
US 2016/0363792 A1 Dec. 15, 2016

(30) Foreign Application Priority Data
Dec. 10, 2014 (CN) .......................... 2014 1 0751973

(51) Int. Cl.
*G02F 1/1333* (2006.01)
*F21V 8/00* (2006.01)
(Continued)

(52) U.S. Cl.
CPC ......... *G02F 1/1333* (2013.01); *G02B 6/0051* (2013.01); *G02B 6/0053* (2013.01);
(Continued)

(58) Field of Classification Search
CPC .......................... G02F 1/1333; G02F 1/133528
See application file for complete search history.

(56) References Cited

U.S. PATENT DOCUMENTS

| 8,698,973 B2 | 4/2014 | Wei |
| 9,007,756 B2 | 4/2015 | Kuo et al. |
| (Continued) | | |

FOREIGN PATENT DOCUMENTS

| CN | 101946204 A | 1/2011 |
| CN | 102109689 A | 6/2011 |
| (Continued) | | |

OTHER PUBLICATIONS

Office Action issued on Feb. 25, 2016, by the State Intellectual Property Office of China in corresponding Chinese Patent Application No. 201410751973.9. (5 pages).

(Continued)

*Primary Examiner* — Sang V Nguyen
(74) *Attorney, Agent, or Firm* — Buchanan Ingersoll & Rooney PC

(57) ABSTRACT

A liquid crystal display and a double sided tape therefor are provided. The liquid crystal display comprises: a liquid crystal panel; a backlight unit comprising a back plate, a set of optical films, and a frame; and a double sided tape comprising a first surface coated with a first adhesive and connected to the liquid crystal panel through the first adhesive, and a second surface coated with a second adhesive and connected to the back plate and the set of optical films respectively through the second adhesive. The adhesion strength of the first adhesive on the liquid crystal panel is lower than that of the second adhesive on the set of optical films. After the backlight unit is separated from the liquid crystal panel, the double sided tape can be left on the optical films and the frame. Therefore, the position relationship among the films within the set of optical films would not be (Continued)

damaged, ensuring that the reassembled liquid crystal display can work normally.

4 Claims, 1 Drawing Sheet

(51) Int. Cl.
*G02F 1/133* (2006.01)
*G02F 1/1335* (2006.01)
(52) U.S. Cl.
CPC ....... *G02B 6/0055* (2013.01); *G02F 1/13306* (2013.01); *G02F 1/133308* (2013.01); *G02F 1/133514* (2013.01); *G02F 1/133528* (2013.01); *G02F 2001/133317* (2013.01); *G02F 2202/28* (2013.01)

(56) References Cited

U.S. PATENT DOCUMENTS

| | | | | |
|---|---|---|---|---|
| 2004/0028895 | A1* | 2/2004 | Yamakami | B32B 27/08 428/354 |
| 2006/0268568 | A1* | 11/2006 | Oku | B29D 11/00663 362/561 |
| 2009/0081452 | A1* | 3/2009 | Husemann | B32B 7/12 428/346 |
| 2009/0183819 | A1* | 7/2009 | Matsuhira | B32B 37/12 156/99 |
| 2010/0047518 | A1* | 2/2010 | Husemann | B32B 5/022 428/141 |
| 2010/0288998 | A1* | 11/2010 | Kikuchi | H01L 33/06 257/13 |
| 2010/0289980 | A1 | 11/2010 | Husemann et al. | |
| 2011/0121356 | A1* | 5/2011 | Krawinkel | C03C 27/10 257/100 |
| 2011/0273643 | A1* | 11/2011 | Arai | G02F 1/133528 349/64 |
| 2012/0169961 | A1* | 7/2012 | Ha | G02F 1/133308 349/61 |
| 2013/0034713 | A1* | 2/2013 | Busman | G02B 1/04 428/217 |
| 2014/0139760 | A1* | 5/2014 | Lee | G06F 3/041 349/12 |
| 2014/0307197 | A1* | 10/2014 | Moriwaki | G09F 9/30 349/58 |
| 2015/0009451 | A1* | 1/2015 | Zhu | G02F 1/13363 349/64 |

FOREIGN PATENT DOCUMENTS

| | | | |
|---|---|---|---|
| CN | 102956154 A | 3/2013 | |
| JP | 2005-200498 | * 7/2005 | ............... C09J 7/02 |
| JP | 2005-200498 A | 7/2005 | |
| JP | 2007-286156 A | 11/2007 | |
| JP | 2009-227826 A | 10/2009 | |

OTHER PUBLICATIONS

International Search Report and Written Opinion (Forms PCT/ISA/220, PCT/ISA/210 and PCT/ISA/237) dated Sep. 6, 2015, by the State Intellectual Property Office of China in corresponding PCT Application No. PCT/CN2014/094824. (11 pages).

* cited by examiner

LIQUID CRYSTAL DISPLAY DEVICE AND DOUBLE SIDED TAPE THEREFOR

CROSS REFERENCE TO RELATED APPLICATION

The present application claims benefit of Chinese patent application CN 201410751973.9, entitled "A LIQUID CRYSTAL DISPLAY AND A DOUBLE SIDED TAPE THEREFOR" and filed on Dec. 10, 2014, which is incorporated herein by reference.

TECHNICAL FIELD

The present disclosure relates to a liquid crystal display, and a double sided tape therefor.

TECHNICAL BACKGROUND

In modern society, a liquid crystal display has become an important component necessary for electronic devices like mobile phones, computers, and related mechanical apparatus. The liquid crystal display can convey people certain information through displaying content, so that people can get the information timely.

Figure 1:
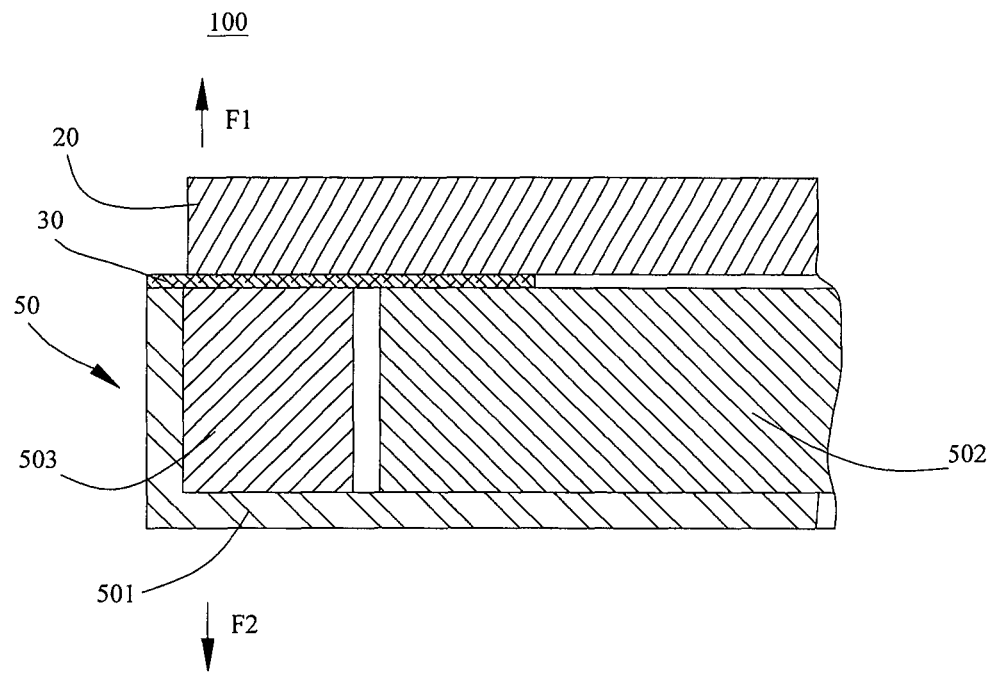

As shown in FIG. 1, a current liquid crystal display 100 mainly comprises a liquid crystal panel 20, a double sided tape 30, and a backlight unit 50 adhered to the liquid crystal panel 20 through the double sided tape 30. The backlight unit 50 comprises a back plate 501, a frame 503 and a set of optical films 502. One of the surfaces of the double sided tape 30 is connected to the liquid crystal panel 20, while the other is connected to the frame 503 and the set of optical films 502.

When the liquid crystal display 100 is undergoing a maintenance, two external forces F1 and F2 are required to be applied on the liquid crystal panel 20 and the backlight unit 50 respectively from one side of the liquid crystal display 100, so as to separate the liquid crystal panel 20 and backlight unit 50 from each other gradually. While the liquid crystal panel 20 is separated from the backlight unit 50, the double sided tape 30 is most likely to be left on the liquid crystal panel 20, so that the double sided tape 30 would be disengaged from the set of optical films 502. However, the double sided tape 30 disengaged from the set of optical films 502 can destroy the position relationship among the films within the set of optical films 502, damaging the set of optical films 502, and causing the reassembled liquid crystal display unable to work normally.

SUMMARY OF THE INVENTION

The present disclosure is to provide a liquid crystal display, which can prevent the double sided tape from being left on the liquid crystal panel after separated from the set of optical films, so that the position relationship among the films within the set of optical films would not be damaged, ensuring that the reassembled liquid crystal display can work normally.

The present disclosure provides a liquid crystal display, comprising:
  a liquid crystal panel;
  a backlight unit, comprising a back plate, a set of optical films arranged between the back plate and the liquid crystal panel, and a frame arranged between the back plate and the liquid crystal panel and around the set of optical films; and
  a double sided tape, comprising a first surface coated with a first adhesive and connected to the liquid crystal panel through the first adhesive, and a second surface coated with a second adhesive and connected to the back plate and the set of optical films respectively through the second adhesive, wherein the adhesion strength of the first adhesive on the liquid crystal panel is lower than the adhesion strength of the second adhesive on the set of optical films.

In one example, the adhesion material in the first adhesive is different from that in the second adhesive, the viscosity of the adhesion material in the first adhesive is lower than that of the adhesion material in the second adhesive, and the concentration of the adhesion material in the first adhesive is no more than that of the adhesion material in the second adhesive.

In one example, the adhesion materials in the first and the second adhesives are the same, but the concentration of the adhesion material in the first adhesive is lower than that of the adhesion material in the second adhesive.

In one example, the set of optical films comprises a diffuser film, a brightness enhancement film, another diffuser film, a light guide plate and a reflection film that are distributed along a direction from the liquid crystal panel to the back plate in sequence.

In one example, the liquid crystal panel comprises a polarizer film, a color filter substrate, a liquid crystal layer, an array substrate, a polarizer sheet, a drive circuit and a printed circuit board that are stacked one on another in sequence.

In one example, the first and second adhesives both are acrylic adhesives.

The present disclosure also provides a double sided tape for the liquid crystal display, comprising a first surface coated with a first adhesive and connected to the liquid crystal panel through the first adhesive, and a second surface coated with a second adhesive and connected to the back plate and the set of optical films respectively through the second adhesive, wherein the adhesion strength of the first adhesive on the liquid crystal panel is lower than that of the second adhesive on the set of optical films.

In one example, the adhesion material in the first adhesive is different from that in the second adhesive, the viscosity of the adhesion material in the first adhesive is lower than that of the adhesion material in the second adhesive, and the concentration of the adhesion material in the first adhesive is no more than that of the adhesion material in the second adhesive.

In one example, the adhesion materials in the first and the second adhesives are the same, but the concentration of the adhesion material in the first adhesive is lower than that of the adhesion material in the second adhesive.

In one example, the first and second adhesives both are acrylic adhesives.

According to the present disclosure, while the backlight unit is separated from the liquid crystal panel, the double sided tape for the liquid crystal display has to be separated from the liquid crystal panel and left on the optical films and the frame. Therefore, the position relationship among the films within the set of optical films would not be damaged, ensuring that the reassembled liquid crystal display can work normally.

Further, the liquid crystal display according to the present disclosure has the advantages of simple structure, easiness in process and assembly, safety in use, and convenience for popularization and application.

BRIEF DESCRIPTION OF THE ACCOMPANYING DRAWINGS

The present disclosure will be explained in detail with reference to the embodiments and the accompanying drawings, wherein:

FIG. 1 schematically shows the structure of a liquid crystal panel of the prior art.

Figure 2:
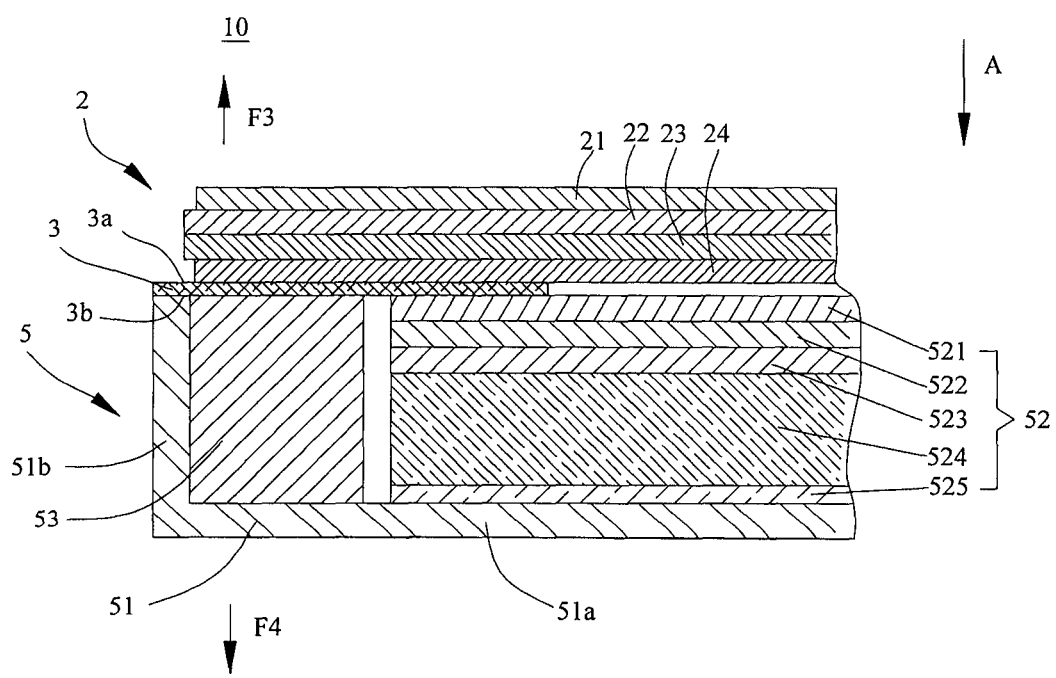

FIG. 2 schematically shows the structure of a liquid crystal display of the present disclosure.

In the accompanying drawings, the same components are indicated with the same reference sign. The drawings are not drawn to actual scale.

DETAILED DESCRIPTION OF THE EMBODIMENTS

The present disclosure will be further explained with reference to the accompanying drawings.

FIG. 2 shows a liquid crystal display 10 according to the present disclosure. The liquid crystal display 10 can be applied to electronic devices like mobile phones, computers, and related mechanical apparatus. The liquid crystal display can convey people certain information through displaying content, so that people can get the information timely.

As shown in FIG. 2, the liquid crystal display 10 comprises a rectangular liquid crystal panel 2, a frame-like double sided tape 3, and a backlight unit 5 connected to the liquid crystal panel 2 through the double sided tape 3. The backlight unit 5 functions as a light source for the liquid crystal panel 2, ensuring that the liquid crystal panel 2 can display images clearly.

Optionally, the liquid crystal panel 2 can be a TFT-LCD liquid crystal panel (i.e. a liquid crystal panel of a thin film transistor liquid crystal display), comprising a polarizer film 21, a color filter substrate 22 (also known as an opposite electrode substrate), a liquid crystal layer, an array substrate 23, a polarizer sheet 24, a drive circuit, and a printed circuit board that are all distributed along a direction from top to bottom (i.e. a direction of A) in sequence. The drive circuit, the crystal layer, the color filter substrate 22, the array substrate 23 and the printed circuit board are known for one skilled in the art, and thus are discussed here no longer.

The backlight unit 5 comprises a back plate 51, a set of optical films 52 arranged between the back plate 51 and the liquid crystal panel 2, and a frame 53 arranged between the back plate 51 and the liquid crystal panel 2 and around the set of optical films 52. The set of optical films 52 comprises a diffuser film 521, a brightness enhancement film 522, another diffuser film 523, a light guide plate 524 and a reflection film 525 that are all distributed along a direction from the liquid crystal panel 2 to the back plate 2 (i.e. the direction of A) in sequence. The backlight unit 5 further comprises an optical source arranged between the light guide plate 524 and the frame 53, wherein the optical source can be a LED light, the brightness of which can be adjusted to control the brightness of the liquid crystal display 10. Moreover, the set of optical films 52 can be implemented through other forms of structure, such as the structure formed by adding or removing one or several films.

According to the present disclosure, the double sided tape 3 is composed of base material and an adhesive. The base material can be formed by paper, fabric, or plastic film, while the adhesive can be an environment friendly one, such as an acrylic adhesive (i.e. adhesives containing acrylic acid and methyl acrylic acid). The base material comprises a first surface 3a and an opposite, second surface 3b. The adhesive comprises a first adhesive coating on the first surface 3a, and a second adhesive coating on the second surface 3b. The first surface 3a of the double sided tape 3 is connected to the liquid crystal panel 2 through the first adhesive, while the second surface 3b is connected to the back plate 51 and the set of optical films 52 respectively through the second adhesive. The liquid crystal panel 2 is firmly fixed with the backlight unit 5 together through the double sided tape 3.

In order to prevent the double sided tape 3 from being left on the liquid crystal panel 2 after the liquid crystal panel 2 is separated from the set of optical films 52, the adhesion strength of the first adhesive on the liquid crystal panel 2 is required to be lower than that of the second adhesive on the set of optical films 52. As the adhesion strength of the second adhesive on the set of optical films 52 made of glass is lower than that of the same second adhesive on the frame 53 made of rubber, and the adhesion strength of the first adhesive on the crystal panel 2 is less than that of the second adhesive on the set of optical films 52, the adhesion strength of the first adhesive on the liquid crystal panel 2 is lower than both that of the second adhesive on the set of optical films 52 and that of the second adhesive on the frame 53. Here, the adhesion strength is an adhesive force per unit area, while the adhesive force equals a product of the adhesion strength and the contacting area at the location of adhesion.

As shown in FIG. 2, when two external forces F3 and F4 are applied on the liquid crystal panel 2 and the backlight unit 5 respectively from one side of the liquid crystal display 10, as the adhesion strength of the first adhesive on the liquid crystal panel 2 is lower than both that of the second adhesive on the set of optical films 52 and that of the second adhesive on the frame 53, the double sided tape 3 has to be separated from the liquid crystal 2 and left on the set of optical films 52 and the frame 53. In this manner, the structure of the set of optical films 52 can be prevented from being damaged, ensuring that the reassembled liquid crystal display 10 can work normally.

The present disclosure provides the following two examples, wherein the adhesion strength of the first adhesive on the liquid crystal panel 2 can be set as being lower than that of the second adhesive on the set of optical films 52.

In the first example, the adhesion material in the first adhesive is different from that in the second adhesive, the viscosity of the adhesion material in the first adhesive is lower than that of the adhesion material in the second adhesive, and the concentration of the adhesion material in the first adhesive is no more than that of the adhesion material in the second adhesive. In this way, the adhesion strength between the first surface 3a and the liquid crystal panel 2 can be reduced effectively, ensuring that the double sided tape 3 can be separated from the liquid crystal panel 2 successfully, and then left on the frame 53 and the set of optical films 52. Here, the adhesion material is also known as a mastic, which is a basic component of adhesive and plays a role of adhesion.

In the second example, the adhesion materials in the first and the second adhesives are the same, but the concentration of the adhesion material in the first adhesive is lower than that of the adhesion material in the second adhesive. In this way, the adhesion strength between the first surface 3a and the liquid crystal surface 2 can be reduced effectively, ensuring that the double sided tape 3 can be separated from the liquid crystal panel 2 successfully, and then left on the frame 53 and the set of optical films 52.

In a preferred embodiment, the back plate 51 comprises a bottom 51a and a side part 51b fixed and connected to the edge of the bottom 51a. The side part 51b, encircling the frame 53, is utilized to locate the frame 53 and ensure that the frame 53 is hardly deformed. Furthermore, the second surface 3b of the double sided tape 3 can be adhered to the top of the side part 51b, so as to enhance the stability of the frame 53 in the backlight unit 5.

After the backlight unit 5 is separated from the liquid crystal panel 2, the double sided tape 3 of the liquid crystal panel 10 according to the present disclosure has to be separated from the liquid crystal panel 2 and left on the set of optical films 52 and the frame 53. Therefore, the position relationship among the films within the set of optical films would not be damaged, ensuring that the reassembled liquid crystal display can work normally.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific examples disclosed herein, but rather includes all the technical solutions falling within the scope of the claims.

The invention claimed is:

1. A liquid crystal display, comprising:
    a liquid crystal panel;
    a backlight unit, comprising a back plate, a set of optical films arranged between the back plate and the liquid crystal panel, and a frame arranged between the back plate and the liquid crystal panel and around the set of optical films; and
    a double sided tape, comprising a first surface coated with a first adhesive and connected to the liquid crystal panel through the first adhesive, and a second surface coated with a second adhesive and connected to the hack plate and the set of optical films respectively through the second adhesive,
    wherein a first adhesion strength of the first adhesive on the liquid crystal panel is lower than a second adhesion strength of the second adhesive on the set of optical films; and
    wherein a first adhesion material in the first adhesive is different from a second adhesion material in the second adhesive, a first viscosity of the first adhesion material in the first adhesive is lower than a second viscosity of the second adhesion material in the second adhesive, and a first concentration of the first adhesion material in the first adhesive is no more than a second concentration of the second adhesion material in the second adhesive.

2. The liquid crystal display according to claim 1, wherein the set of optical films comprises a diffuser film, a brightness enhancement film, another diffuser film, a light guide plate and a reflection film that are distributed along a direction from the liquid crystal panel to the back plate in sequence.

3. The liquid crystal display according to claim 2, wherein the liquid crystal panel comprises a polarizer film, a color filter substrate, a liquid crystal layer, an array substrate, a polarizer sheet, a drive circuit and a printed circuit board that are stacked one on the top of another in sequence.

4. A double sided tape used for liquid crystal display, comprising a first surface coated with a first adhesive and connected to a liquid crystal panel of the liquid crystal display through the first adhesive, and a second surface coated with a second adhesive and connected to a back plate and a set of optical films of the liquid crystal display respectively through the second adhesive,
    wherein a first adhesion strength of the first adhesive on the liquid crystal panel is lower than a second adhesion strength of the second adhesive on the set of optical films; and
    wherein a first adhesion material in the first adhesive is different from a second adhesion material in the second adhesive, a first viscosity of the first adhesion material in the first adhesive is lower than a second viscosity of the second adhesion material in the second adhesive, and a first concentration of the first adhesion material in the first adhesive is no more than a second concentration of the second adhesion material in the second adhesive.

* * * * *